United States Patent [19]

Minnis

[11] Patent Number: 5,143,045
[45] Date of Patent: Sep. 1, 1992

[54] APPARATUS FOR IGNITING BRIQUETS

[76] Inventor: James A. Minnis, Rte. 4, Box 100, Terrell, Tex. 75160

[21] Appl. No.: 760,601

[22] Filed: Sep. 16, 1991

[51] Int. Cl.⁵ .......................................... A47J 37/00
[52] U.S. Cl. .................... 126/25 B; 126/9 R
[58] Field of Search ............. 126/25 B, 25 R, 9 R, 126/9 A, 9 B; 99/422, 448, 449, 340

[56] References Cited

U.S. PATENT DOCUMENTS

| | | | |
|---|---|---|---|
| 1,017,505 | 2/1912 | Brandstatter | 126/25 B |
| 3,382,863 | 5/1968 | Katz | 126/25 B |
| 3,865,052 | 2/1975 | Streets et al. | 126/25 B |
| 3,933,144 | 1/1976 | Bandy | 126/25 B |
| 3,934,520 | 1/1976 | Brennan et al. | 126/25 B |
| 4,102,317 | 7/1978 | Shonnard et al. | 126/25 B |
| 4,130,103 | 12/1978 | Zimmerman | 126/25 B |
| 4,175,925 | 11/1979 | Paek et al. | 126/25 B |
| 4,531,507 | 7/1985 | Gerson | 126/25 B |
| 4,604,986 | 8/1986 | Barnes | 126/25 B |

FOREIGN PATENT DOCUMENTS

WO87/00017  1/1987  PCT Int'l Appl. .............. 126/25 B

Primary Examiner—James C. Yeung
Attorney, Agent, or Firm—James E. Bradley

[57] ABSTRACT

An apparatus and method for igniting briquets in a cooking utensil utilizes a solid flammable fire starter. A solid block of fire starter is placed on the base of the utensil and lit. An enclosure with apertures is placed on the base of the cooking utensil over the fire starter. Briquets are placed on the base and over the enclosure. The fire starter flames pass through the enclosure and ignite the briquets. Once the briquets are sufficiently ignited, they are spread over the base. The enclosure remains on the base during cooking.

12 Claims, 2 Drawing Sheets

APPARATUS FOR IGNITING BRIQUETS

BACKGROUND OF THE INVENTION

1. Field of the Invention

This invention relates in general to outdoor cooking utensils utilizing briquets, such as of charcoal, and particularly to an apparatus and method for igniting the briquets.

2. Description of the Prior Art

One common type of outdoor cooking utensil utilizes briquets composed of a carbonaceous material, such as charcoal or wood. The cooking utensil has a pan for receiving the briquets and a grill located above the briquets on which food is cooked. Initially, the user of the cooking utensil ignites the briquets by some means. After the briquets have burned sufficiently into hot coals, the food is placed on the grill.

The most common means for igniting the briquets employs a liquid petroleum based lighter fluid. The user pours lighter fluid over the briquets and then ignites the lighter fluid with a match. The lighter fluid burns, and the flame eventually provides enough heat to ignite the briquets.

Although the method described above is workable, the lighter fluid creates an unpleasant odor. Furthermore, the lighter fluid occasionally fails to ignite the briquets sufficiently. On those occasions, the user may be tempted to pour additional lighter fluid on the briquets while they are smoldering. This and other forms of misuse often create significant safety hazards.

There are other devices for igniting briquets, both marketed and shown in prior patents. Several of these devices include some type of container in which the briquets are stacked together to enhance combustion. In some cases, the user employs a solid combustible fire starter rather than lighter fluid. These devices normally require the user to dump the hot briquets out of the container onto the pan of the cooling utensil. In performing this step, the user must exercise caution to avoid being burned by either the container or the briquets.

SUMMARY OF THE INVENTION

In this invention, the user places a fire starter on the base of the pan of the cooking utensil and lights the fire starter. The user then places a small enclosure on the base of the pan of the cooking utensil. The enclosure, which is perforated, extends over the fire starter The user places briquets on the top of the enclosure and on the base in a mound. The flames from the fire starter then ignite the briquets. Once the briquets are sufficiently ignited, the user may spread the briquets from the mound more evenly over the base. The enclosure remains on the base while the food is cooked.

In one embodiment, the enclosure is a relatively small, rectangular parallelepiped made of expanded metal, which is open on the bottom and on two opposite sides In another embodiment, the enclosure is a helical coil made of metal wire.

DETAILED DESCRIPTION OF THE INVENTION

Figure 1:
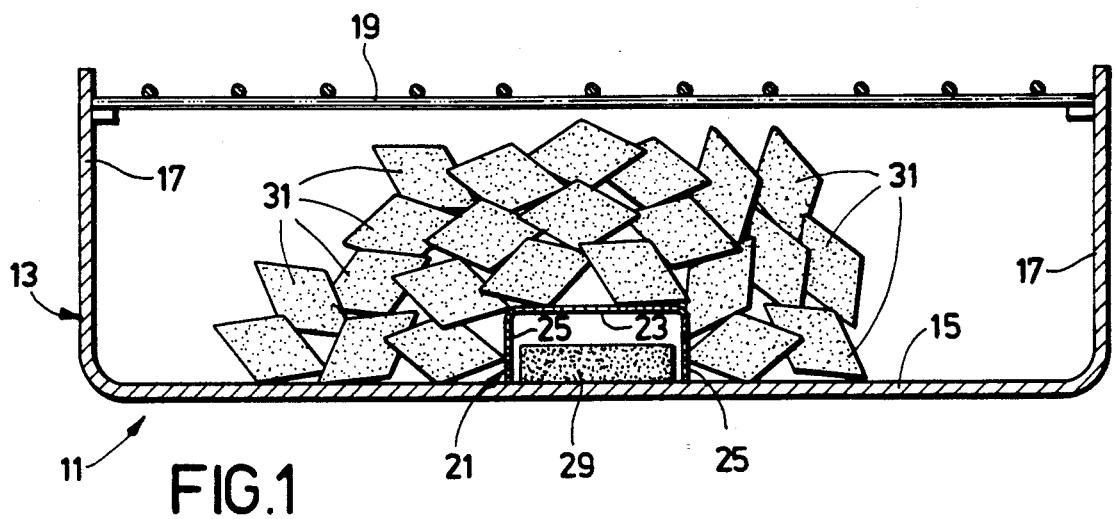
FIG. 1 is a schematic sectional view illustrating a cooking utensil having an apparatus constructed in accordance with this invention for igniting briquets.

Referring to FIG. 1, cooking utensil 11 is conventional. It has a pan 13 of some type. Pan 13 has a base 15 and side walls 17. Base 15 may comprise a wire grid located above the actual bottom of the pan 13. For simplicity, the wire grid is not shown in FIG. 1. A grill 19 mounts to the sidewalls 17. Grill 19 is a conventional grid, having rods or bars arranged in a gridwork for supporting food.

Figure 2:
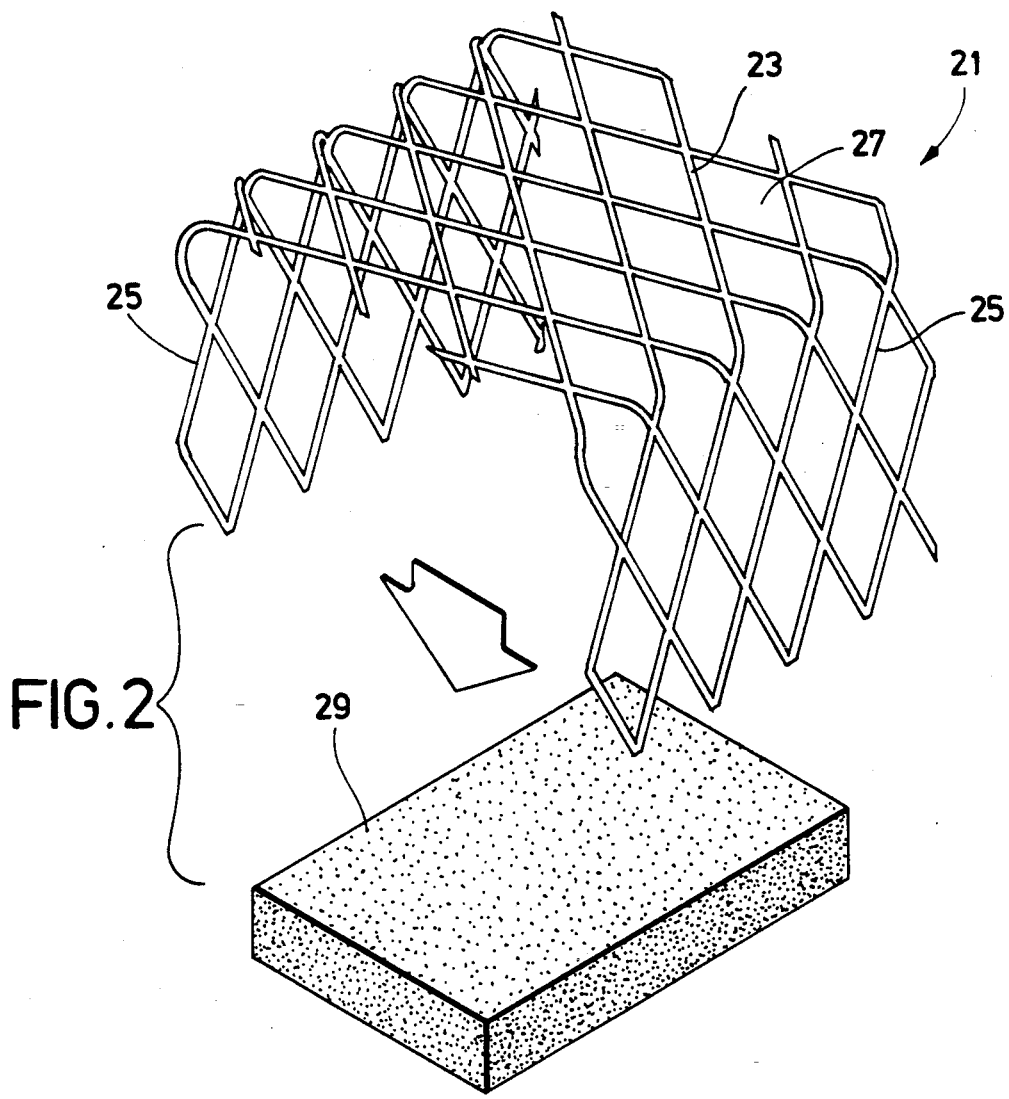
FIG. 2 is an enlarged exploded view of the igniting apparatus used with the cooking utensil of FIG. 1.

The igniting device of this invention includes an enclosure 21. Enclosure 21 is considerably smaller than the pan 13 in both width and length. Enclosure 21 has a top 23 and side walls 25, as shown in FIG. 2. The ends and the bottom of enclosure 21 are open. Enclosure 21 is adapted to be placed on the base 15. The lower edges of the side walls 25 contact the base 15 and support the top 23 above the base 15 a short distance. The top 23 is located considerably below the elevation where the grid 19 is located. Enclosure 21 is not secured to the base 15.

Enclosure 21 contains apertures 27 in the top 23 and side walls 25. In the embodiment shown in FIGS. 1 and 2, enclosure 21 is made of an expanded metal, having a diamond pattern, with the apertures 27 located between the metal strips. Top 23 is flat and perpendicular to the side walls 25. However, top 23P and side walls 25 could be formed into a general A-frame configuration, if desired Also, enclosure 21 could be made of a material other than expanded metal having a diamond pattern.

A fire starter 29 is located within the enclosure 21. Fire starter 29 is made of a conventional, solid combustible material. It must be a material that can readily be lit with a match. In the embodiment shown in FIGS. 1 and 2, fire starter 29 is a small rectangular block of a composite material made up of sawdust with a vegetable oil, such as from pumpkins. The fire starter 29 ignites to create a flame. The top 23 of the enclosure 21 is spaced above the upper surface of the fire starter 29. The clearance is sufficient to allow the free passage of air to the flame, but small enough for the flames to pass through the apertures 27.

The cooking utensil 11 utilizes briquets 31 to provide the heat source. Briquets 31 are chunks of charcoal or wood. The charcoal may be created from burning wood, or it may comprise compressed coal. Briquets 31 are conventional.

In operation, the user places the fire starter 29 on the base 15. The user lights the fire starter 29, using a match. The fire starter 29 lights best if the match is held to an edge. Normally, one of the edges is rougher and more frayed than the others, having been cut by a saw. This edge usually lights best.

The user then places the enclosure 21 on the base 15 over the fire starter 29. The flames pass upward through the apertures 27. The user then places the briquets 31 on top of the enclosure 21 and on the base 15. The briquets 31 initially are placed in a mound, as shown in FIG. 1.

The flames extend through the apertures 27 and cause ignition of the briquets 31. After the briquets 31 have sufficiently ignited so that they are glowing coals, the user spreads the briquets out more evenly onto the base 15. The user then places the grill 19 on top. The user leaves the enclosure 21 in place under the briquets 31.

The user then cooks the food by placing it on top of the grill 19.

For the next use, the user may reuse the enclosure 21 by inserting another fire starter 29. After several uses, the enclosure 21 may deteriorate because of the heat. If so, another enclosure 21 may be utilized.

Figure 3:
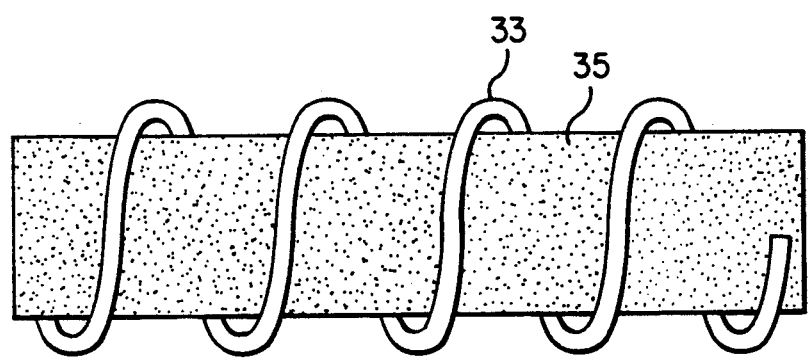
FIG. 3 is a perspective view of an alternative embodiment of the igniting apparatus used with the cooking utensil of FIG. 1.

FIG. 3 depicts an alternative embodiment of the igniting apparatus used with the cooking utensil 11. Enclosure 33 is a helical coil made of metal wire, within which the user places a fire starter 35. Fire starter 35 is a rectangular block of a solid combustible material, the block being small enough to fit within the enclosure 33, but large enough to provide flames sufficient to pass through the enclosure 33 and to ignite the briquets 31. Both the enclosure 33 and the fire starter 35 are adapted to be placed on the base 15 of the pan 13 of the cooking utensil 11. Enclosure 33 is not secured to the base 15.

The enclosure 33 has a longitudinal axis, with open ends. The turns of the enclosure 33 are spaced apart from each other on the axis. The diameter of each of the turns is the same.

The pitch of the enclosure 33 is the distance between adjacent turns of the helical coil. The pitch is smaller than the average size of the briquets 31. This prevents the briquets 31 from falling through the enclosure 33. The pitch is large enough to allow the flames from the fire starter 35 to pass freely through the enclosure 33. Preferably, the pitch of the enclosure 33 is between one-half and one inch.

In operation, the user places the fire starter 35 within the enclosure 33 and places both the enclosure 33 and the fire starter 35 on the base 15. The user lights the fire starter 35. The flames from the fire starter 35 pass upward through the gaps between adjacent turns of the helical coil, enclosure 33.

The user then places briquets 31 on top of the enclosure 33 and on the base 15. The flames from the fire starter 35 ignite the briquets 31. After the briquets 31 are sufficiently ignited, the user spreads the briquets 31 evenly over the base 15. The user then places the grill 19 in position to cook the food, leaving enclosure 33 in place under the briquets 31.

The present invention has significant advantages. The fire starter readily lights the briquets. Petroleum based lighter fluid is not needed, eliminating the odor created by it. The briquets ignite without having to be carried from a container to the cooking utensil. There is no need to remove any hot fire-starting apparatus after the ignition of the briquets.

While the invention has been shown in only two of its forms, it should be apparent to those skilled in the art that it is not so limited, but is susceptible to various changes without departing from the scope of the invention.

I claim:

1. A method for preparing briquets for cooking food in a cooking utensil having a base for receiving briquets and a grill for supporting food above the briquets, the base having a width and a length, and the grill having a width and a length substantially the same as the corresponding width and length of the base, said method comprising the steps of:

providing an enclosure with a width and a length substantially less than the corresponding width and length of the base;

placing a fire starter of solid flammable material within the enclosure and placing the fire starter and the enclosure on the base of the cooking utensil;

lighting the fire starter to create flames;

placing briquets on the base and over and in contact with the enclosure;

igniting the briquets with the flames from the starter;

placing the grill on the cooking utensil above the briquets for receiving food, and leaving the enclosure on the base under the briquets during cooking of the food.

2. The method according to claim 1, wherein the enclosure is a helical coil with a plurality of turns, a longitudinal axis concentrically extending through the turns, a first end and a second end spaced along the longitudinal axis from the first end, and wherein the step of placing the enclosure on the base includes placing the coil with its longitudinal axis in a plane generally parallel with the base.

3. The method according to claim 2, wherein the step of providing the enclosure includes providing each of the turns with substantially the same diameter.

4. A method for starting a fire of briquets in a cooking utensil having a base for receiving briquets, said method comprising the steps of:

providing an enclosure in the form of a helical coil with a plurality of turns, a longitudinal axis concentrically extending through the turns, a first end and a second end spaced along the longitudinal axis from the first end;

placing a fire starter of solid flammable material in the helical coil and placing the helical coil and the fire starter on the base of the cooking utensil with the longitudinal axis of the coil in a plane generally parallel with the base;

lighting the fire starter to create flames;

placing briquets on the base and over the helical coil in contact with the helical coil;

igniting the briquets with the flames from the fire starter; and placing a grill on the cooking utensil above the fire starter and briquets for receiving food to be cooked.

5. The method according to claim 4, wherein the step of providing the enclosure includes providing each of the turns with substantially the same diameter.

6. In a cooking utensil having a base for receiving briquets and a grill for supporting food above the briquets, an apparatus for igniting the briquets, comprising in combination:

an enclosure, in the form of a helical coil with a plurality of turns, a longitudinal axis concentrically extending through the turns, a first end and a second end spaced along the longitudinal axis from the first end, the coil adapted to be positioned on the base of the cooking utensil below the grill with the longitudinal axis generally parallel with the base; and a solid flammable fire starter located within the turns of the enclosure;

wherein the briquets are adapted to be positioned on the base and over the enclosure in a mound prior to ignition of the briquets, with the fire starter within the enclosure creating flames to ignite the briquets.

7. The apparatus for igniting briquets according to claim 6, wherein each of the turns of the enclosure has substantially the same diameter.

8. The apparatus for igniting briquets according to claim 6, wherein the axial distance between turns of the helical coil is less than the average minimum size of the briquets, in order to prevent the briquets from falling through the turns of the helical coil and onto the fire starter.

9. The apparatus for igniting briquets according to claim 6, wherein the fire starter has a length and a width, and wherein the axial length of the helical coil is at least substantially as long as the length of the fire starter.

10. The apparatus for igniting briquets according to claim 6, wherein each of the first and second ends of the helical coil are open so as to allow the fire starter to be inserted into either end.

11. An apparatus for igniting a stack of solid fuel members on a base, comprising in combination:

an enclosure, in the form of a helical coil with a plurality of turns, a longitudinal axis concentrically extending through the turns, a first end and a second end spaced axially apart from the first end, each of the turns being axially spaced from adjacent turns, the coil adapted to be positioned on the base with its longitudinal axis generally horizontal; and a solid flammable fire starter located within the turns of the enclosure, each of the first and second ends being open so as to allow the fire starter to be inserted into the turns of the enclosure from either end;

wherein the solid fuel members are adapted to be positioned on the base and over and in contact with the enclosure prior to ignition of the solid fuel members, with the fire starter with in the enclosure creating flames which pass upward through the turns of the enclosure to ignite the solid fuel members.

12. The apparatus according the claim 11, wherein each of the turns of the enclosure has substantially the same diameter.

* * * * *